United States Patent [19]

Seki

[11] Patent Number: 5,394,691

[45] Date of Patent: Mar. 7, 1995

[54] AIR-FUEL RATIO CONTROL SYSTEM FOR INTERNAL COMBUSTION ENGINES HAVING A PLURALITY OF CYLINDER GROUPS

[75] Inventor: Yasunari Seki, Wako, Japan

[73] Assignee: Honda Giken Kogyo K.K., Tokyo, Japan

[21] Appl. No.: 200,823

[22] Filed: Feb. 23, 1994

[30] Foreign Application Priority Data

Feb. 26, 1993 [JP] Japan .................................. 5-063103

[51] Int. Cl.$^6$ .............................................. F01N 3/20
[52] U.S. Cl. ........................................ 60/276; 60/277; 60/285; 123/703
[58] Field of Search .................. 60/274, 276, 277, 285; 123/672, 674, 703

[56] References Cited

U.S. PATENT DOCUMENTS

| | | | |
|---|---|---|---|
| 5,090,199 | 2/1992 | Ikuta | 60/276 |
| 5,097,700 | 3/1992 | Nakane | 60/277 |
| 5,119,629 | 6/1992 | Kume | 60/274 |
| 5,154,055 | 10/1992 | Nakane | 60/277 |
| 5,157,920 | 10/1992 | Nakaniwa | 60/274 |
| 5,168,700 | 12/1992 | Furuya | 60/274 |
| 5,201,173 | 4/1993 | Fujimoto | 60/277 |
| 5,211,011 | 5/1993 | Nishikawa | 60/285 |
| 5,261,230 | 11/1993 | Yuuki | 60/277 |
| 5,271,223 | 12/1993 | Hoshi | 60/276 |
| 5,315,823 | 5/1994 | Nishikawa | 60/285 |

Primary Examiner—Douglas Hart
Assistant Examiner—Daniel J. O'Connor
Attorney, Agent, or Firm—Arthur L. Lessler

[57] ABSTRACT

An air-fuel ratio control system for an internal combustion engine having a first and second groups of cylinders and first and second catalytic converters arranged respectively in first and second exhaust systems extending from the respective cylinder groups, includes first and second upstream oxygen sensors upstream of the catalytic converters, and a single downstream oxygen sensor downstream of the catalytic converters. The air-fuel ratios of air-fuel mixtures supplied into the first and second cylinder groups are controlled by the use of first and second air-fuel ratio control amounts based on outputs from the respective first and second upstream oxygen sensors and the downstream oxygen sensor, when the engine is in a predetermined operating condition. The air-fuel ratio of an air-fuel mixture supplied into one of the first and second cylinder groups is controlled by the use of a third air-fuel ratio control amount based solely on an output from the downstream oxygen sensor, and the air-fuel ratio of an air-fuel mixture supplied into the other cylinder group by the use of a predetermined value, when the engine is in an operating condition other than the predetermined operating condition, whereby deterioration of the first or second catalytic converter is detected based on the downstream oxygen sensor output.

5 Claims, 14 Drawing Sheets

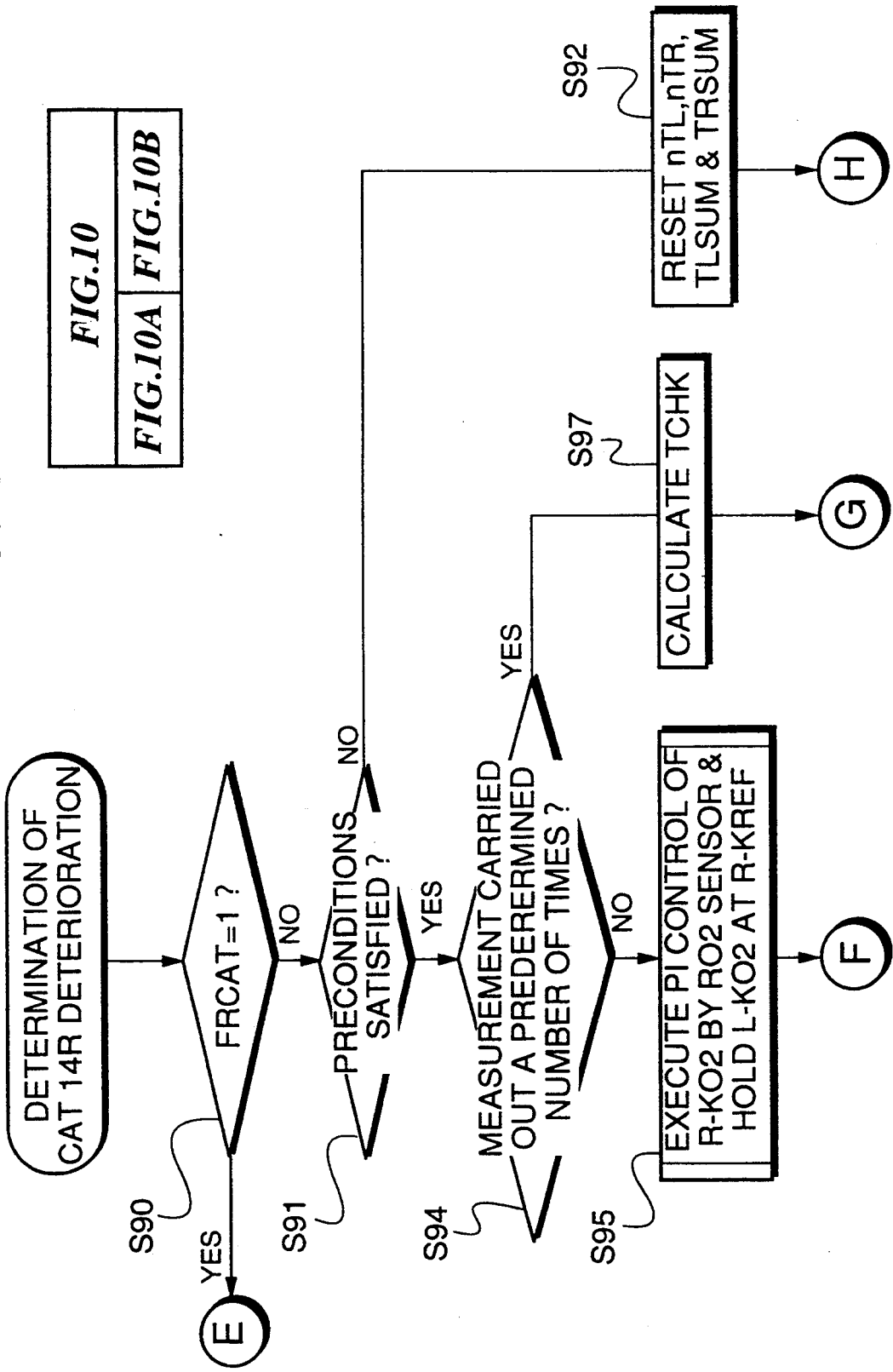

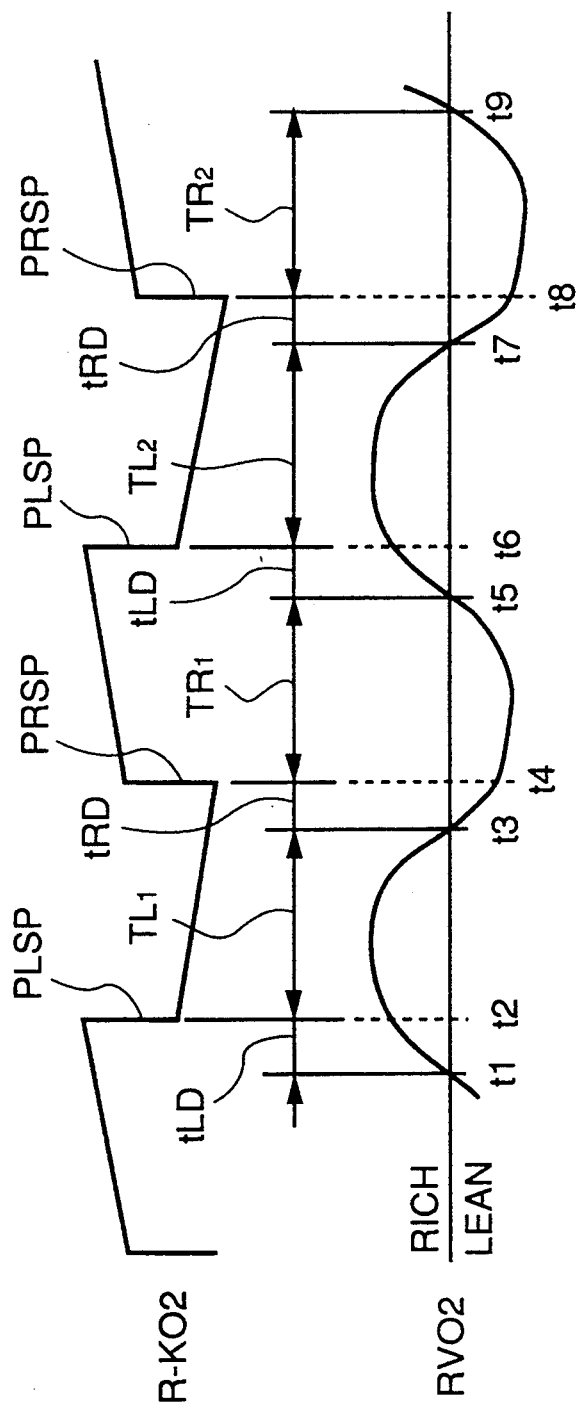

AIR-FUEL RATIO CONTROL SYSTEM FOR INTERNAL COMBUSTION ENGINES HAVING A PLURALITY OF CYLINDER GROUPS

BACKGROUND OF THE INVENTION

1. Field of the Invention

This invention relates to an air-fuel ratio control system for an internal combustion engine having a plurality of cylinder groups, which carries out air-fuel ratio control per cylinder group, e.g. for each bank in the case of a V-type engine, and more particularly, to an air-fuel ratio control system of this kind, which is capable of detecting deterioration of catalytic converters arranged in the exhaust system.

2. Prior Art

There is conventionally known an air-fuel ratio control system for internal combustion engines, which has oxygen concentration sensors (hereinafter referred to as "the O2 sensors") arranged, respectively, upstream and downstream of a three-way catalyst as a catalytic converter arranged in the exhaust system of the engine, and carries out air-fuel ratio feedback control by calculating a feedback control amount (air-fuel ratio control amount) for controlling the air-fuel ratio of an air-fuel mixture supplied to the engine (hereinafter referred to as "the supplied air-fuel ratio"), based on outputs from the upstream and downstream O2 sensors.

A system of this kind carries out air-fuel ratio control by correcting the air-fuel ratio of a mixture supplied to each cylinder to the same value. To detect deterioration of a three-way catalyst used in an internal combustion engine employing the above air-fuel ratio control method, a method of detecting a deterioration degree of the catalyst has been proposed, e.g. by Japanese Provisional Patent Publication (Kokai) No. 63-97852, which comprises calculating the number of times of inversion of outputs from the downstream O2 sensor for a predetermined time period when the engine is in a predetermined operating condition, and determining that the catalyst is deteriorated when the calculated number of times of inversion exceeds a predetermined value.

In addition to the above-mentioned air-fuel ratio control method, there is also known another airfuel ratio control method, as proposed by U.S. Pat. No. 5,228,287, in which air-fuel ratio feedback control is carried out based on air-fuel ratio control amounts which are different between the cylinder groups. This air-fuel ratio control method which controls per cylinder group is superior in air-fuel ratio control accuracy to the abovementioned method, and includes various types, such as a method which controls per bank (right bank and left bank) for a V-type engine, and a method which controls per cylinder group (a first group consisting of #1 and #4 cylinders and a second group consisting of #2 and #3 cylinders) for a straight-type four-cylinder engine. In these engines, upstream O2 sensors are provided for respective banks or cylinder groups, a single catalytic converter is arranged, for example, at a location of a converged portion of an exhaust manifold extending from the cylinder groups, and a single downstream O2 sensor is arranged downstream of the catalytic converter.

However, if the above proposed catalyst deterioration-detecting method is applied together with the air-fuel ratio control method for such an engine employing a single catalytic converter, the above feedback control operations are carried out based on different air-fuel ratio control amounts responsive to the outputs from the upstream O2 sensors of the respective cylinder groups, and accordingly exhaust gases emitted from the cylinder groups flow into the single catalytic converter. As a result, it is impossible to accurately measure the O2 storage amount of the catalyst (a time period from inflow of a rich exhaust gas to generation of a rich output from the downstream O2 sensor, or a time period from inflow of a lean exhaust gas to generation of a lean output from the downstream O2 sensor).

More specifically, the air-fuel ratio control amounts for the cylinder groups are independently calculated, so that when a mixture having a lean air-fuel ratio is supplied to one cylinder group, while at the same time a mixture having a rich air-fuel ratio is supplied to the other cylinder group, it becomes unclear whether the total air-fuel ratio is in the rich state or in the lean state. Therefore, it cannot be judged whether O2 molecules are being stored into the catalytic converter or being discharged therefrom. As a result, the O2 storage amount cannot be properly measured, whereby deterioration of the catalyst cannot be accurately detected.

One way to solve the above problem would be to provide a catalytic converter for each of the cylinder groups.

However, even if the catalytic converters are provided for the respective cylinder groups, a single downstream O2 sensor, which will be provided downstream of the catalytic converters, will detect the air-fuel ratio of mixed exhaust gases after purification by the catalysts of the respective cylinder groups. Therefore, by the use of the catalyst deterioration-detecting method as proposed by Japanese Provisional Patent Publication No. 63-97852, referred to above, which makes it a prerequisite that the air-fuel ratio control should be carried out by supplying the same air-fuel ratio control amount to all the cylinder groups, it is impossible to separately detect the O2 storage amount of each of the catalytic converters, leading to incapability of detecting deterioration of each catalyst. To eliminate this inconvenience, a catalytic converter and a downstream O2 sensor may be provided for each cylinder group to detect deterioration of each catalyst, which, however, results in a high cost due to the use of two downstream O2 sensors.

SUMMARY OF THE INVENTION

It is the object of the invention to provide an air-fuel ratio control system for an internal combustion engine having a plurality of cylinder groups, which is capable of accurately detecting deterioration of catalytic converters provided for respective cylinder groups, at a low cost.

To attain the above object, the present invention provides an air-fuel ratio control system for an internal combustion engine having a plurality of cylinders divided into a first group of cylinders and a second group of cylinders, first and second exhaust systems extending respectively from the first and second groups of cylinders, the first and second exhaust systems having downstream end portions thereof joined together into a confluent portion, and first and second catalytic converters arranged respectively in the first and second exhaust systems, the air-fuel ratio control system including first and second upstream oxygen sensors arranged respectively in the first and second exhaust systems upstream of the first and second catalytic converters, and a single downstream oxygen sensor arranged in the confluent portion of the first and second exhaust systems downstream of the first and second catalytic converters, comprising:

first air-fuel ratio control means operable when the engine is in a predetermined operating condition, for controlling the air-fuel ratio of an air-fuel mixture supplied into the first group of cylinders by the use of a first air-fuel ratio control amount based on outputs from the first upstream oxygen sensor and the downstream oxygen sensor, and for controlling the air-fuel ratio of an air-fuel mixture supplied into the second group of cylinders by the use of a second air-fuel ratio control amount based on outputs from the second upstream oxygen sensor and the downstream oxygen sensor;

second air-fuel ratio control means operable when the engine is in an operating condition other than the predetermined operating condition, for controlling the air-fuel ratio of an air-fuel mixture supplied into one of the first and second groups of cylinders by the use of a third air-fuel ratio control amount based solely on an output from the downstream oxygen sensor, and for controlling the air-fuel ratio of an air-fuel mixture supplied into the other of the first and second groups of cylinders by the use of a predetermined value; and catalyst deterioration-detecting means for detecting deterioration of the first catalytic converter or the second catalytic converter, based on an output from the second air-fuel ratio control means.

Preferably, the predetermined value is a learned value of one of the first and second air-fuel ratio control amounts.

Alternatively, the predetermined value is a fixed value.

Preferably, the second air-fuel ratio control means alternately controls the air-fuel ratios of the first and second groups of cylinders by the use of the third air-fuel ratio control amount and the predetermined value for each group of cylinders, the catalyst deterioration-detecting means alternately detecting deterioration of the first catalytic converter and deterioration of the second catalytic converter, based on the output from the second air-fuel ratio control means.

Also preferably, the catalyst deterioration-detecting means detects deterioration of the first and second catalytic converters, based on an inversion time period of the output from the downstream oxygen sensor obtained during operation of the second air-fuel ratio control means.

The above and other objects, features, and advantages of the invention will be more apparent from the following detailed description taken in conjunction with the accompanying drawings.

BRIEF DESCRIPTION OF THE DRAWINGS

FIG. 11 is a timing chart useful in explaining the operation of the program of FIG. 10;

DETAILED DESCRIPTION

The invention will now be described in detail with reference to the drawings showing embodiments thereof.

Figure 1:
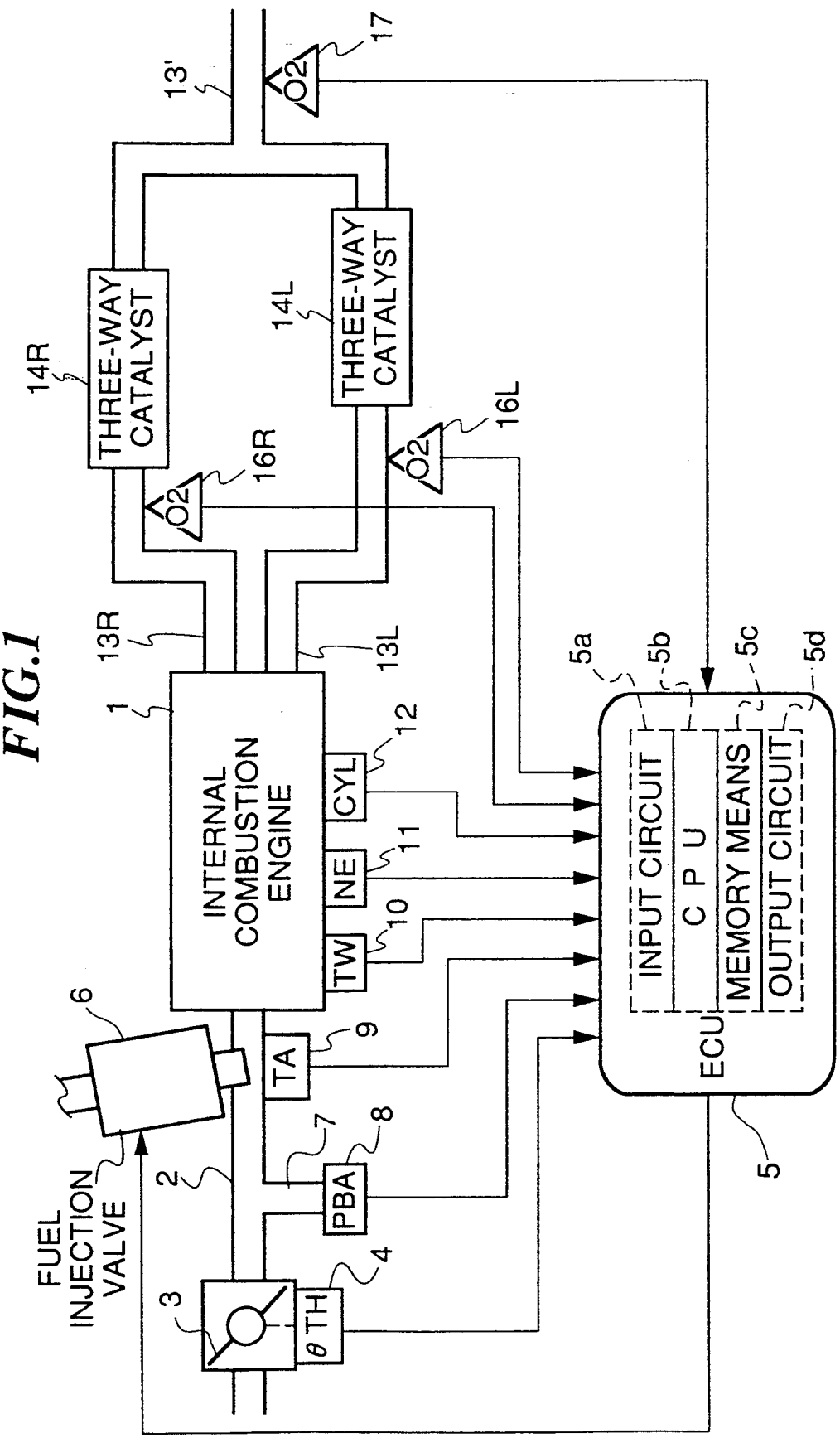
FIG. 1 is a block diagram showing the whole arrangement of an internal combustion engine and an air-fuel ratio control system therefor, according to an embodiment of the invention.

Referring first to FIG. 1, there is shown the whole arrangement of an internal combustion engine and an air-fuel ratio control system therefor, according to an embodiment of the invention. In the figure, reference numeral 1 designates, for example, a V-type/8-cylinder engine. Arranged at a location between a right (R) bank and a left (L) bank of the engine are intake pipes 2 corresponding in number (four) to the number of cylinders of the respective banks. In an upstream converged portion of the intake pipes 2 of the engine 1, there is arranged a throttle valve 3, to which is connected a throttle valve opening ($\theta$TH) sensor 4 for generating an electric signal indicative of the sensed throttle valve opening and supplying the same to an electronic control unit (hereinafter referred to as "the ECU") 5.

Fuel injection valves 6 are each provided for each cylinder and arranged in the corresponding intake pipe 2 between the engine 1 and the throttle valve 3 at a location slightly upstream of an intake valve, not shown. Each fuel injection valve 6 is connected to a fuel pump, not shown, and electrically connected to the ECU 5 to have its valve opening period controlled by a signal therefrom.

On the other hand, an intake pipe absolute pressure (PBA) sensor 8 is provided via a conduit 7 at a location immediately downstream of the throttle valve 3 for sensing intake pipe absolute pressure (PBA), and is electrically connected to the ECU 5 for supplying an electric signal indicative of the sensed absolute pressure to the ECU 5. An intake air temperature (TA) sensor 9 is inserted into one of the intake pipes 2 at a location downstream of the intake pipe absolute pressure sensor 8 for supplying an electric signal indicative of the sensed intake air temperature TA to the ECU 5.

An engine coolant temperature (TW) sensor 10, which may be formed of a thermistor or the like, is inserted in a coolant-filled cylinder block of the engine 1 for supplying an electric signal indicative of the sensed engine coolant temperature TW to the ECU 5. An engine rotational speed (NE) sensor 11 and a cylinder-discriminating (CYL) sensor 12 are arranged in facing relation to a camshaft or a crankshaft of the engine 1, neither of which is shown. The NE sensor 11 generates a pulse as a TDC signal pulse at one of predetermined crank angles whenever the crankshaft rotates through 180 degrees, while the CYL sensor 12 generates a signal pulse (CRK signal pulse) at a predetermined crank angle of a particular cylinder of the engine, both of the pulses being supplied to the ECU 5.

Three-way catalysts (catalytic converter; hereinafter referred to as "the catalysts") 14R and 14L are arranged, respectively, in exhaust pipes 13R and 13L provided at the R bank and the L bank of the engine 1, respectively, and extending from the cylinder block of the engine, for purifying components, such as HC, CO and NOx in the exhaust gases. Arranged in the respective exhaust pipes 13R and 13L upstream of the catalysts 14R and 14L are oxygen concentration sensors (hereinafter referred to as "the upstream O2 sensors") 16R and 16L. The exhaust pipes 13R and 13L are joined together at a location downstream of the catalysts 14R and 14L, into a confluent exhaust pipe portion 13'. Mounted in the confluent exhaust pipe portion 13' is an oxygen concentration sensor (hereinafter referred to as "the downstream O2 sensor") 17. These O2 sensors 16R, 16L and 17 detect oxygen concentration of oxygen present in the exhaust gases at the respective locations, and output signals indicative of the sensed oxygen concentration to the ECU 5.

The ECU 5 comprises an input circuit 5a having the functions of shaping the waveforms of input signals from various sensors as mentioned above, shifting the voltage levels of sensor output signals to a predetermined level, converting analog signals from analog-output sensors to digital signals, and so forth, a central processing unit (hereinafter referred to as "the CPU") 5b, memory means 5c storing various operational programs which are executed in the CPU 5b, and for storing results of calculations therefrom, etc., and an output circuit 5d which outputs driving signals to the fuel injection valves 6. The memory means 5c comprises a RAM for the R bank and a RAM for the L bank for storing data related to the R bank and the L bank, respectively. Further stored into these RAM's are data on results of determinations of deterioration of the catalysts 14R, 14L which are carried out by routines, hereinafter described.

The CPU 5b operates in response to the above-mentioned engine parameter signals from the sensors to determine operating conditions in which the engine 1 is operating, such as a feedback control region and open-loop control regions, and calculates, based upon the determined engine operating conditions, fuel injection periods R-Tout and L-Tout over which the fuel injection valves 6 are to be opened, in synchronism with generation of TDC signal pulses, by the use of the following equation (1):

$$R\text{-}Tout = Ti \times R\text{-}KO2 \times KLS \times K1 + K2 \quad (1)$$

$$L\text{-}Tout = Ti \times L\text{-}KO2 \times KLS \times K1 + K2$$

where Ti represents a basic fuel injection amount, i.e. a basic value of the fuel injection period Tout, which is determined according to the engine rotational speed NE and the intake pipe absolute pressure PBA. A Ti map for determining the Ti value is stored in the memory means 5c.

R-KO2 represents an air-fuel ratio correction coefficient (hereinafter referred to simply as "the correction coefficient") which is calculated in response to the oxygen concentration in exhaust gases sensed by the O2 sensors 16R and 17. The correction coefficient R-KO2 is set to such a value that the detected air-fuel ratio corresponds to a desired value when the engine 1 is operating in the air-fuel ratio feedback control region, while it is set to predetermined values corresponding to the respective operating regions of the engine when the engine 1 is in the open-loop control regions. Similarly, L-KO2 represents an air-fuel ratio correction coefficient which is calculated in response to the oxygen concentration in exhaust gases sensed by the O2 sensors 16L and 17.

KLS represents a mixture-leaning coefficient, which is set to a predetermined value smaller than 1.0 when the engine 1 is in a predetermined decelerating condition, while it is set to 1.0 when the engine is in a condition other than the predetermined decelerating condition.

K1 and K2 represent other correction coefficients and correction variables, respectively, which are set according to engine operating parameters to such values as optimize engine operating characteristics, such as fuel consumption and engine accelerability.

The CPU 5b supplies driving signals based on the results thus calculated via the output circuit 5d to the fuel injection valves 6.

Figure 2:
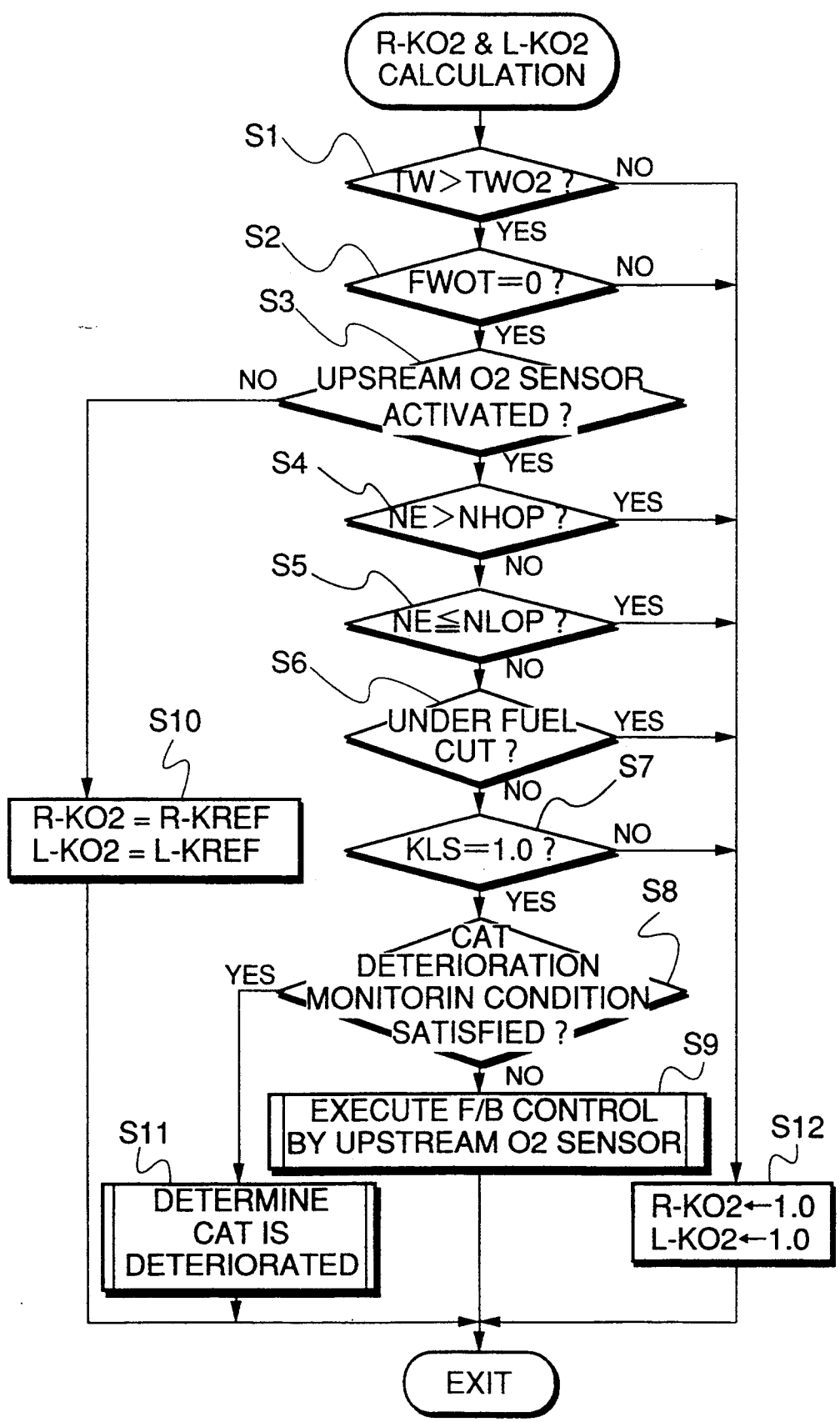
FIG. 2 is a flowchart showing a program for calculating air-fuel ratio correction coefficients R-KO2 and L-KO2.

FIG. 2 shows a program for calculating the air-fuel ratio correction coefficients R-KO2 and L-KO2, which are executed at predetermined fixed time intervals (e.g. 5 msec).

At steps S1 to S8, it is determined whether or not first feedback control-effecting conditions are satisfied, under which the feedback control based on the outputs from the upstream O2 sensors 16R and 16L can be executed. Specifically, it is determined whether or not the engine coolant temperature TW is higher than a first predetermined engine coolant temperature TWO2 (e.g. 25° C.) at the step S1, whether or not a flag FWOT which is set to a value of "1" when the engine is in a predetermined high load operating condition is equal to a value of "0" at the step S2, whether or not the upstream O2 sensors 16R and 16L are activated at the step S3, whether or not the engine rotational speed NE is higher than a predetermined higher engine rotational speed NHOP at the step S4, whether or not the engine rotational speed NE is equal to or lower than a predetermined lower engine rotational speed NLOP at the step S5, whether or not the engine is under fuel cut at the step S6, whether or not the air-fuel ratio-leaning coefficient KLS is equal to a value of 1.0 at the step S7, and whether or not a monitoring condition for catalyst (CAT) deterioration is satisfied at the step S8.

When the engine coolant temperature TW is higher than the predetermined engine coolant temperature TWO2, FWOT=0, the engine is not in the predetermined high load engine operating condition, the upstream O2 sensors 16R and 16L are activated, the engine rotational speed NE falls within a range of NLOP<NE≦NHOP, the engine is not under fuel cut, when KLS=1.0, the engine is not in the predetermined decelerating condition, and at the same time the monitoring condition for CAT deterioration is not satisfied, it is determined that the first feedback control-effecting conditions are satisfied, and then the program proceeds to a step S9, where the correction coefficients R-KO2 and L-KO2 are calculated based on the outputs from the upstream O2 sensors 16R and 16L and the downstream O2 sensor 17. The monitoring condition for CAT deterioration is satisfied if the engine operating condition is steady, i.e. when the engine has been warmed up and at the same time a state in which variations in the engine load, the engine rotational speed NE, and the vehicle speed are small have continued over a predetermined time period.

If both of TW>TWO2 and FWOT=0 are satisfied and at the same time the upstream O2 sensors 16R and 16L are inactivated, the program jumps to a step S10, where the correction coefficients R-KO2 and L-KO2 are set to learned values R-KREF and L-KREF, respectively, which are calculated during the feedback control executed at the step S9. Further, if the monitoring condition for CAT deterioration executed at the step S8 is satisfied, the program proceeds to a step S11, where determination of deterioration of the catalyst, described hereinafter, is carried out.

If any one of the feedback control-effecting conditions is not satisfied, the program proceeds to a step S12, where the correction coefficients R-KO2 and L-KO2 are set to a value of 1.0.

Figure 3A:
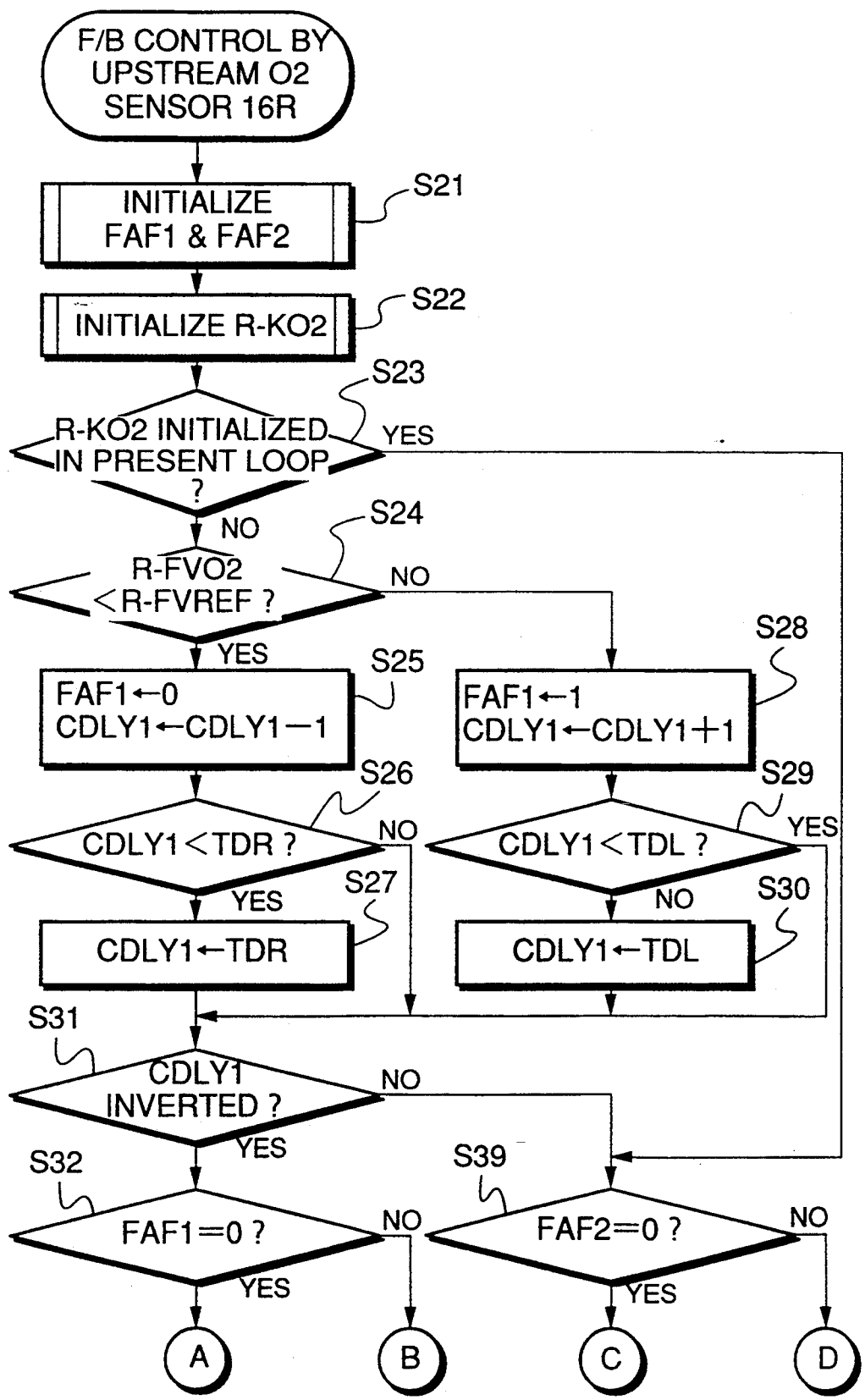
FIG. 3A is a flowchart showing a program for calculating the air-fuel ratio correction coefficient R-KO2, based on an output from an O2 sensor arranged upstream of a catalytic converter arranged in a right (R) bank.
Figure 3B:
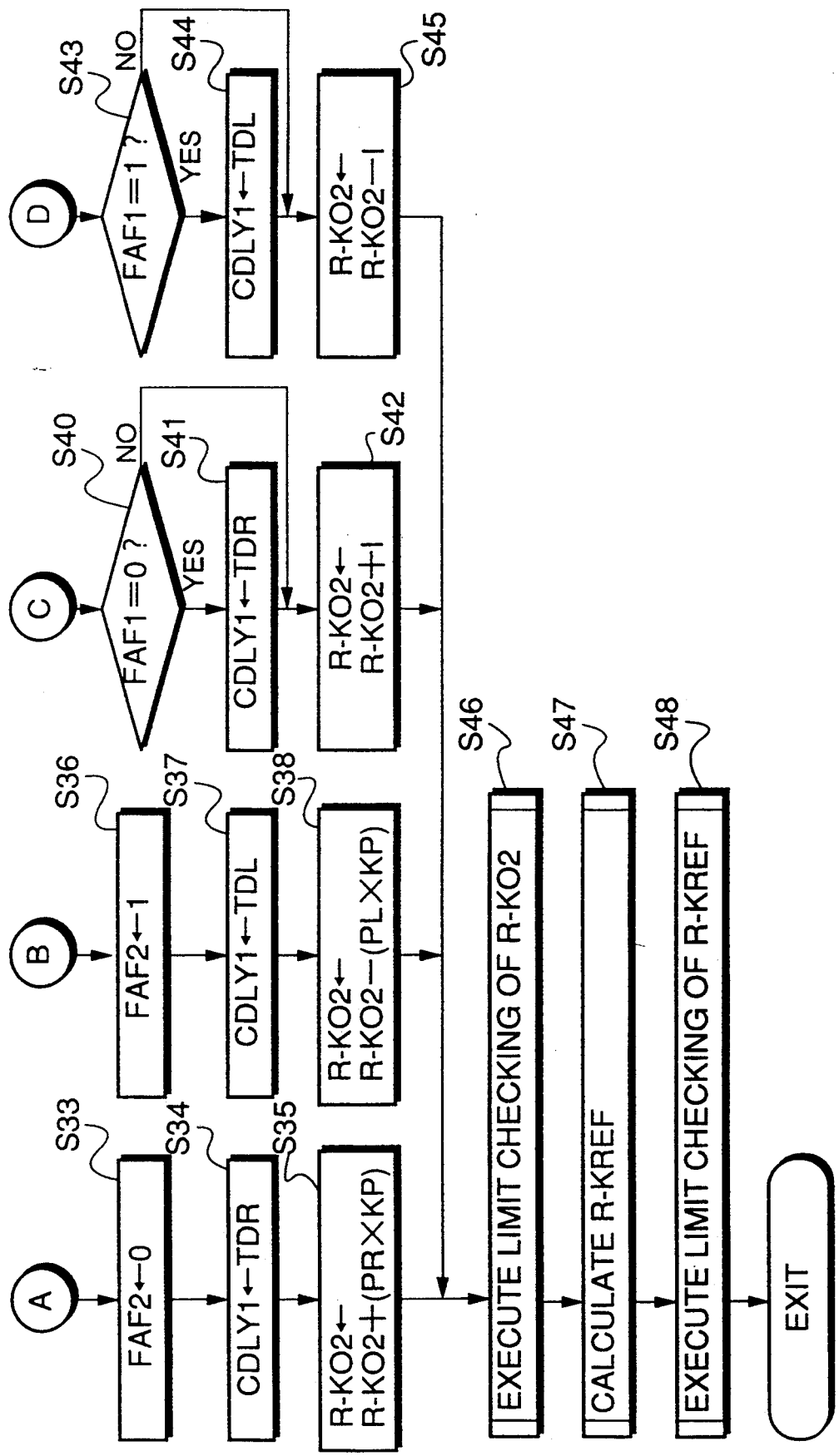
FIG. 3B is a continued part of the flowchart of FIG. 3A.

FIGS. 3A and 3B show a subroutine executed at the step S9 of FIG. 2, where the correction coefficient R-KO2 is calculated in response to an output voltage R-FVO2 from the upstream O2 sensor 16R.

Figure 6:
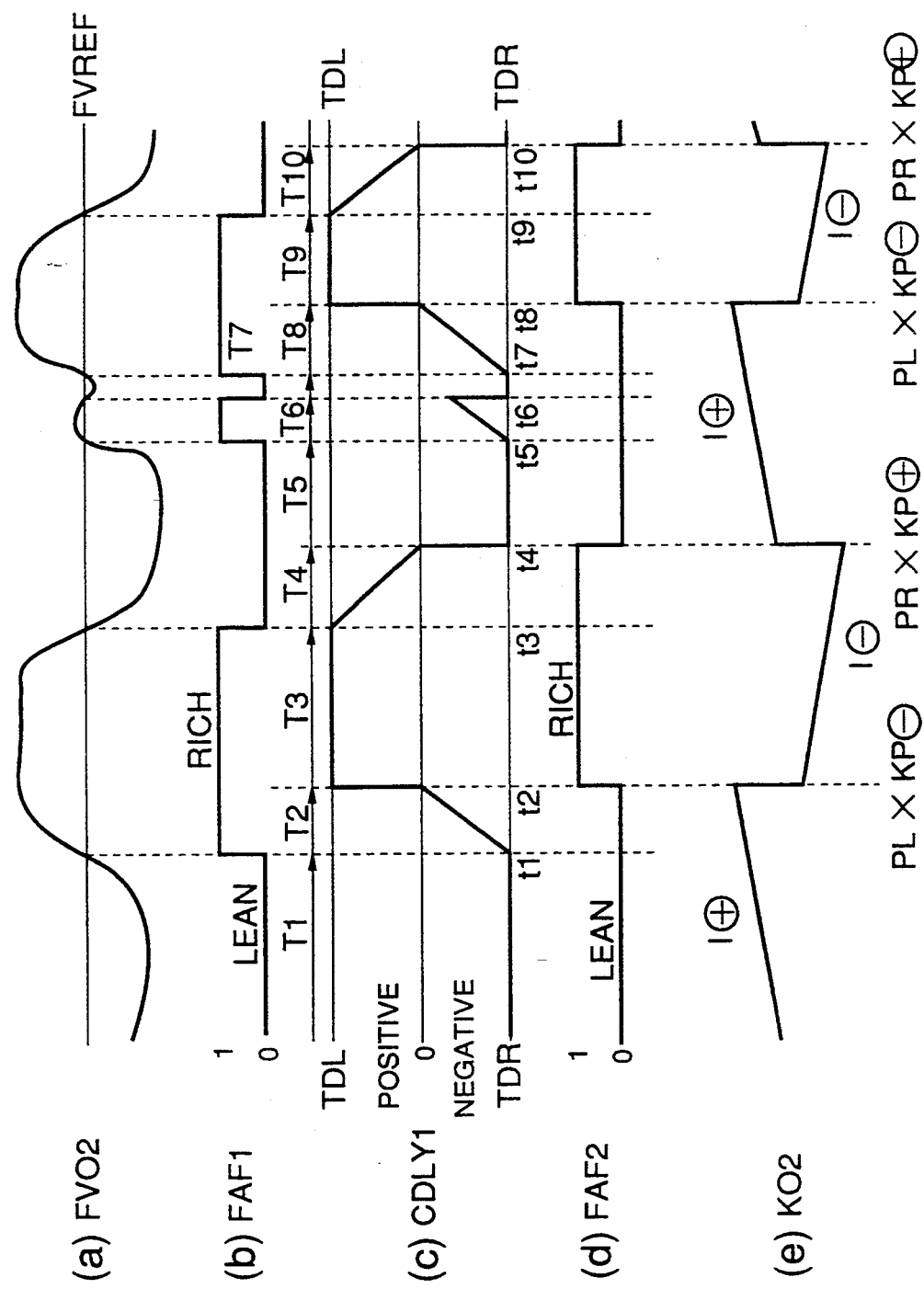
FIG. 6 is a timing chart useful in explaining the operation of the program of FIGS. 3A and 3B.

At a step S21, first and second lean/rich flags FAF1 and FAF2 are initialized. As shown in FIGS. 6(a) and 6(b), the first lean/rich flag FAF1 is set to a value of "1" when the output voltage R-FVO2 from the upstream O2 sensor 16R is higher than a reference voltage R-FVREF (e.g. 0.45 V), that is, when the output voltage R-FVO2 indicates a rich state of the air-fuel ratio, while, as shown in FIG. 6(d), the second lean/rich flag FAF2 is set to the same value as that of the flag FAF1 upon the lapse of a predetermined time period from a time point the first lean/rich flag FAF1 is inverted, i.e. a time point the flag FAF1 is changed from "0" to "1" or "1" to "0".

Figure 4:
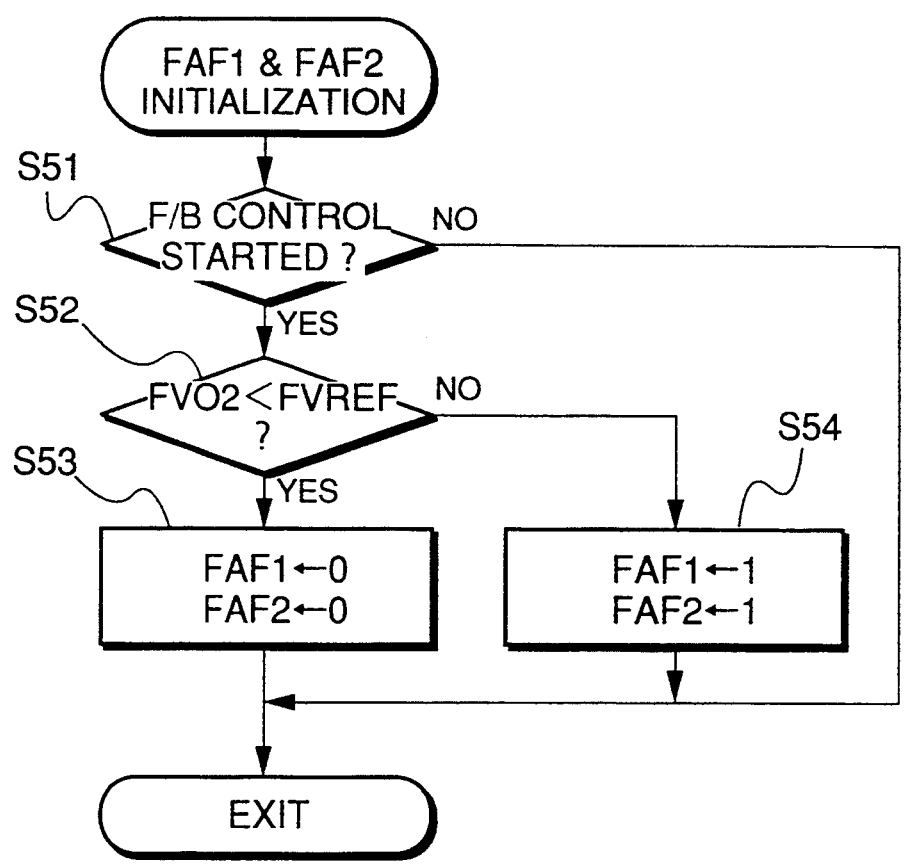
FIG. 4 is a flowchart showing a subroutine for initializing flags used in the program of FIGS. 3A and 3B.

The initialization of these flags FAF1 and FAF2 is executed according to a subroutine shown in FIG. 4. Specifically, first, it is determined at a step S51 whether or not the present loop is immediately after the start of the feedback control, i.e. whether or not the open-loop control was executed in the last loop and the feedback control is to be started in the present loop. If it is determined that the present loop is not the first loop of execution of the feedback control, it is not required to initialize the flags FAF1 and FAF2, and therefore, the present program is immediately terminated.

If the present loop is the first loop of execution of the feedback control, it is determined at a step S52 whether or not the output voltage R-FVO2 from the upstream O2 sensor 16R is lower than the reference voltage R-FVREF. If R-FVO2<R-FVREF is satisfied, both of the first and second lean/rich flags FAF1 and FAF2 are set to "0" at a step S53, whereas if R-FVO2≧R-FVREF is satisfied, both of the flags are set to "1" at a step S54.

Referring again to the FIG. 3A program, the R-KO2 value is initialized at a step S22. Specifically, if the present loop is immediately after the shift from the open loop control to the feedback control, or if the throttle valve 3 is suddenly opened during the feedback control, the learned value R-KREF to be calculated at a step S47, described hereinafter, is applied as an initial value of the R-KO2 value. If the present loop is in a condition other than the above conditions, no initialization of the R-KO2 value is executed at the step S22.

At the following step S23, it is determined whether or not the R-KO2 value has been initialized in the present loop. If it is determined that the R-KO2 value has been initialized, the program jumps to a step S39, whereas if the initialization has not been executed, the program proceeds to a step S24.

When the feedback control is being started, the answer to the question of the step S23 is affirmative (YES), and hence at steps S39 to S45 an initial value of a P term-generation delay counter CDLY1 is set and integral control (I term control) of the R-KO2 value is executed in response to the values of the lean/rich flags FAF1 and FAF2. The counter CDLY1 measures, as shown in FIGS. 6(b), 6(c) and 6(d), a delay time from a time point the first lean/rich flag FAF1 is inverted to a time point the second lean/rich flag FAF2 is inverted, i.e. a time period from a time point the O2 sensor output R-FVO2 is inverted to a time point the proportional control (P term control) is executed.

At the step S39, it is determined whether or not the second lean/rich flag FAF2 is set to "0". If FAF2="0", the program proceeds to the step S40 of FIG. 3B, where it is determined whether or not the first lean/rich flag FAF1 is set to "0". On the other hand, if FAF2="1", the program proceeds to the step S43 of FIG. 3B, where it is determined whether or not the first lean/rich flag FAF1 is set to "1". When the feedback control is being started, if R-FVO2<R-FVREF, both of the flags FAF1 and FAF2 are set to "0" (see FIG. 4), and therefore, the program proceeds via the steps S39 and S40 to the step S41, where the counter CDLY1 is set to a predetermined negative value TDR (e.g. a value corresponding to 120 msec). If R-FVO2≧R-FVREF, both of the flags FAF1 and FAF2 are set to "1", and therefore, the program proceeds via the steps S39 and S43 to the step S44, where the counter CDLY1 is set to a predetermined positive value TDL (e.g. a value corresponding to 40 msec). If both of the flags FAF1 and FAF2 are not equal to "0" or "1", the counter CDLY1 is not initialized. If FAF2="0", a predetermined value I is added to the R-KO2 value at the step S42, whereas if FAF2="1", the predetermined value I is subtracted from the R-KO2 value at the step S45, followed by the program proceeding to a step S46.

If the answer to the question of the step S23 of FIG. 3A is negative (NO), i.e. if the R-KO2 value has not been initialized in the present loop, the program proceeds to the step S24, where it is determined whether or not the upstream O2 sensor output voltage R-FVO2 is lower than the reference voltage R-FVREF. If R-FVO2<R-FVREF, the program proceeds to a step S25, where the first lean/rich flag FAF1 is set to "0" and the P-term generation delay counter CDLY1 is decremented by a value of 1 (see T4 and T10 of FIG. 6(c)). Then, it is determined at a step S26 whether or not the count value of the counter CDLY1 is smaller than the predetermined negative value TDR. If CDLY1<TDR, the counter CDLY1 is set to the value TDR at a step S27, whereas if CDLY≧TDR, the program jumps to a step S31.

If the answer to the question of the step S24 is negative (NO), i.e. if R-FVO2≧R-FVREF, the first lean/rich flag FAF1 is set to "1" and the counter CDLY1 is incremented by 1 at a step S28 (see T2, T6 and T8 of FIG. 6(c)). Then, it is determined at a step S29 whether or not the count value of the counter CDLY1 is smaller than the predetermined positive value TDL. If CDLY1≧TDL, the counter CDLY1 is set to the value TDL at a step S30, whereas if CDLY1<TDL, the program jumps to the step S31.

In this way, the steps S26, S27, S29 and S30 function so that the count value of the counter CDLY1 does not become smaller than the predetermined negative value TDR nor larger than the predetermined positive value TDL.

At the step S31, it is determined whether or not the sign (plus or minus sign) of the count value of the counter CDLY1 has been inverted. If the sign has not been inverted, the I term control is executed at the steps S39 to S45, whereas if the sign has been inverted, the P term control is executed at steps S32 to S38.

At the step S32, it is determined whether or not the first lean/rich flag FAF1 is equal to "0". If FAF1="0", the program proceeds to the step S33 of FIG. 3B, where the second lean/rich flag FAF2 is set to "0", and then the count value of the counter CDLY1 is set to the predetermined negative value TDR at the step S34. Further, the correction coefficient R-KO2 is calculated at the step S35 by the use of the following equation (2) (see time points t4 and t10 of FIG. 6):

$$R\text{-}KO2 = R\text{-}KO2 + PR \times KP \quad (2)$$

where PR represents an enriching proportional term (P term) and KP represents a P term correction coefficient. The PR value is calculated according to a program of FIG. 5, described hereinafter, and the KP value is read from a map, not shown, which is set in accordance with the engine rotational speed NE and the intake pipe absolute pressure PBA.

If the answer to the question of the step S32 is negative (NO), i.e. if FAF1="1", the second lean/rich flag FAF2 is set to "1" at the step S36, and the count value of the counter CDLY1 is set to the predetermined positive value TDL at the step S37. Further, the correction coefficient R-KO2 is calculated at the step S38 by the use of the following equation (3) (see time points t2 and t8 of FIG. 6):

$$R\text{-}KO2 = R\text{-}KO2 - PL \times KP \quad (3)$$

where PL represents a leaning proportional term (P term). The PL value is calculated according to the program of FIG. 5, similarly to the calculation of the PR value.

At the following step S46, limit checking of the R-KO2 value is carried out, and the learned value R-KREF of the R-KO2 is calculated at the step S47. Further, limit checking of the R-KREF value is carried out at a step S48, followed by terminating the program.

According to the program of FIGS. 3A and 3B described above, as shown in FIG. 6, the P term control is executed (time points t2, t4, t8 and t10) after a predetermined delay time (T2, T4, T8 and T10) from a time point the upstream O2 sensor output voltage R-FVO2 is inverted (time points t1, t3, t7 and t9). During a time period over which the second lean/rich flag FAF2 is equal to "0", the I term control for increasing the R-KO2 value is executed (T1, T2 and T5 to T8), whereas during a time period over which the flag FAF2 is equal to "1", the I term control for decreasing the R-KO2 value is executed (T3, T4, T9 and T10). Incidentally, the O2 sensor output R-FVO2 varies with a short repetition period over a time period from the time point t5 to the time point t7, however, the period of variation in the sensor output R-GVO2 is shorter than the delay time of the P term control corresponding to the predetermined negative value TDR1, and therefore, the second lean/rich flag FAF2 is not inverted, resulting in no execution of the P term control over the above time period.

Figure 5:
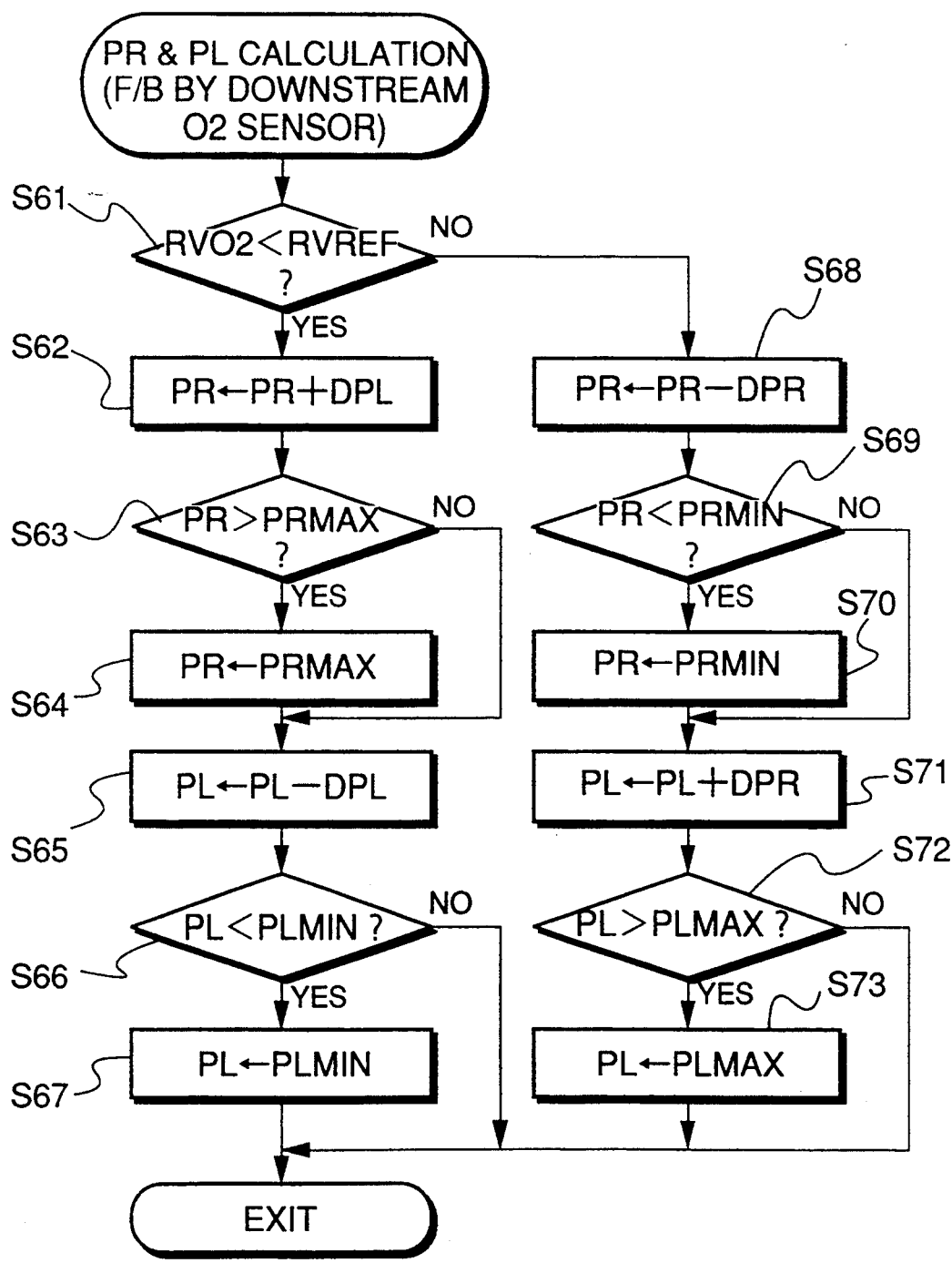
FIG. 5 is a flowchart showing a program for calculating parameter values PR and PL, based on an output from an O2 sensor arranged downstream of the catalytic converter.

FIG. 5 shows a program for calculating the enriching P term PR and the leaning P term PL used in the FIGS. 3A and 3B program. The present program is executed at predetermined fixed time intervals (e.g. 100 msec).

The PR value and the PL value are basically calculated based on an output voltage value RVO2 from the downstream O2 sensor 17 during second feedback control by the downstream O2 sensor 17. However, when the second feedback control cannot be executed (e.g. during idling of the engine, when the downstream O2 sensor 17 is inactive, etc.), a predetermined value or the learned value calculated during the feedback control is applied as the PR and PL values.

Figure 7:
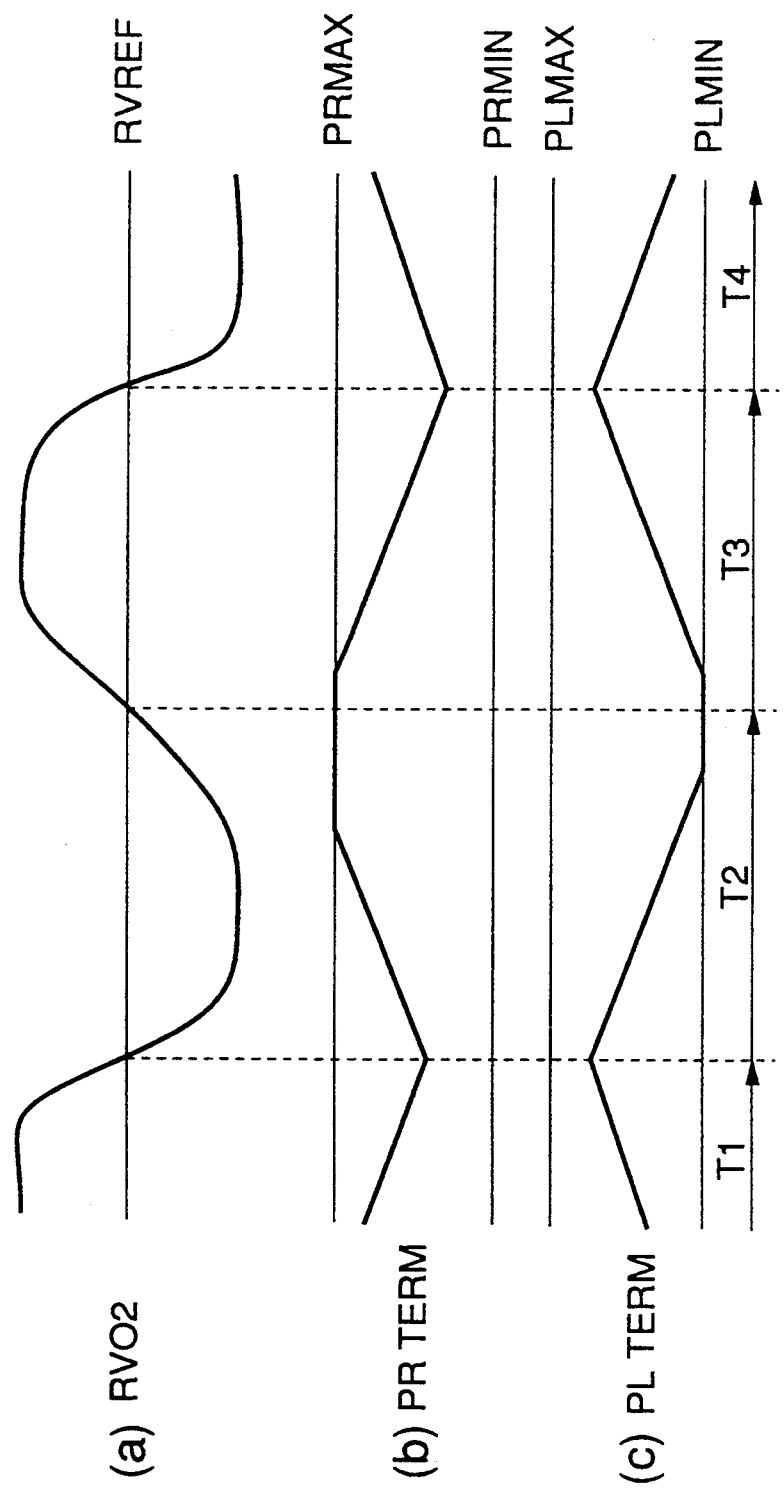
FIG. 7 is a timing chart useful in explaining the operation of the program of FIG. 5.

At a step S61, it is determined whether or not the downstream O2 sensor output voltage RVO2 is lower than a reference value RVREF (e.g. 0.45 V). If RVO2<RVREF, the program proceeds to a step S62, where a leaning-determining correction term DPL is added to the PR value (see T2 and T4 of FIG. 7(b)). When the PR value exceeds an upper limit value PRMAX at a step S63, the PR value is set to the upper limit value PRMAX at a step S64.

At the next step S65, the leaning-determining correction term DPL is subtracted from the PL value (see T2 and T4 of FIG. 7(c)). If the PL value is smaller than a lower limit value PLMIN at a step S66, the PL value is set to the lower limit value PLMIN at a step S67.

On the other hand, if the answer to the question of the step S61 is negative (NO), i.e. if RVO2≧RVREF, the program proceeds to a step S68, where an enrichment-determining correction term DPR is subtracted from the PR value (see T1 and T3 of FIG. 7(b)). If it is determined at a step S69 that the PR value after the subtraction is smaller than a lower limit value PRMIN, the PR value is set to the lower limit value PRMIN at a step S70.

Then, at a step S71, the enrichment-determining correction term DPR is added to the PL value (see T1 and T3 of FIG. 7(c)). If it is determined at a step S72 that the PL value after the addition is larger than an upper limit value PLMAX, the PL value is set to the upper limit value PLMAX at a step S73.

According to the program of FIG. 5 described above, as shown in FIG. 7, during a time period over which RVO2<RVREF holds (T2 and T4), the PR value is increased within a range between the lower and upper limit values PRMIN and PRMAX, while the PL value is decreased within a range between the lower and upper limit values PLMIN and PLMAX. On the other hand, during a time period over which RVO2≧R-

VREF holds (T1 and T3), the PR value is decreased and the PL value is increased within the above-mentioned respective ranges. The L-KO2 value is calculated based on the outputs from the upstream O2 sensor 16L and the downstream O2 sensor 17, similarly to the calculation of the R-KO2 value.

Figure 8:
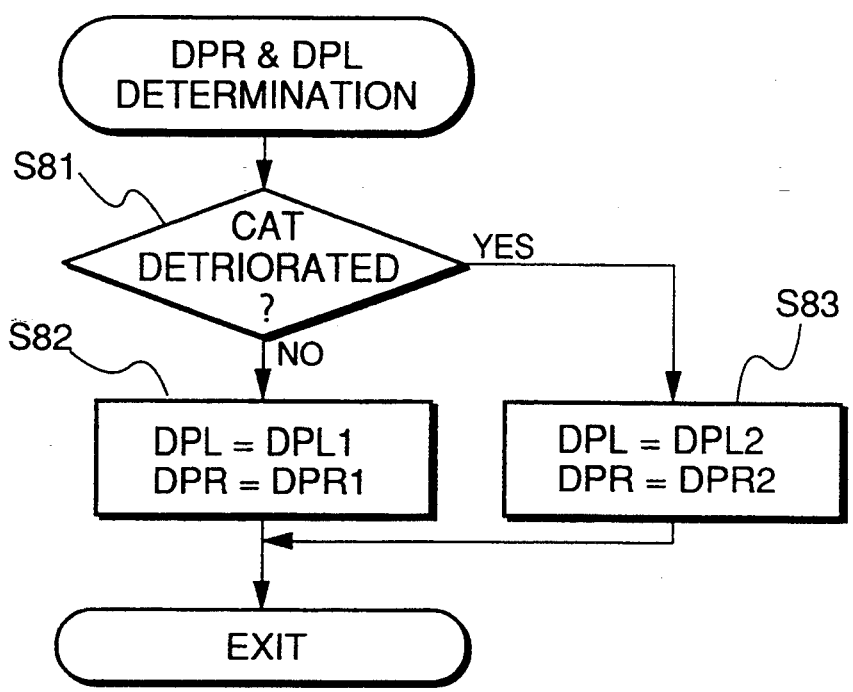
FIG. 8 is a flowchart showing a program for calculating parameter values DPL and DPR used in the program of FIG. 5.

Next, how the correction terms DPR and DPL (first and second updating amounts) are determined in a manner depending upon whether or not deterioration of the performance of the three-way catalysts 14R and 14L occurs will be described with reference to FIG. 8. For the sake of simplification, the following description refers only to determination of the DPR and DPL values in the case of deterioration of the performance of the three-way catalyst 14R.

As shown in the figure, when no deterioration of the catalyst performance is detected at a step S81 by a method, described hereinafter, the DPR value and the DPL value are set to respective predetermined values DPR1 and DPL1 for normal catalyst performance (e.g. 1 and 3, respectively), at a step S82. On the other hand, when deterioration of the catalyst performance is detected at the step S81, the DPR value and the DPL value are set to respective predetermined values DPR2 and DPL2 for deteriorated catalyst performance (e.g. 1 and 4, respectively), at a step S83.

Thus, the updating rate of the PR term and the PL term (skip amount) is increased so that the inclinations of the PR and PL curves over the time periods T2 and T4 in FIGS. 7(b) and 7(c) become sharp when the output voltage RVO2 shows a lean value (i.e. when RVO2<RVREF), such that the value of the PR term increases as compared with a value thereof obtained when the catalyst is normal, and the value of the PL term decreases as compared with a value thereof obtained when the catalyst is normal. As a result, the supplied air-fuel ratio obtained by the air-fuel ratio feedback control based on the output R-FVO2 from the upstream O2 sensor 16R is biased in the richer direction. In this way, it is possible to prevent deviation of the supplied air-fuel ratio in the leaner direction due to deviation of the output from the downstream O2 sensor 17 in the richer direction (which deviation is caused by the reaction of unburnt gas components from the catalyst with oxygen ions supplied from the sensor in the vicinity of a platinum electrode thereof) when the catalyst is deteriorated. When the three-way catalyst 14L is deteriorated, determination of correcting terms DPR and DPL is carried out similarly to the above described method.

In the present embodiment described above, only the leaning-determining correction term DPL is corrected to an increased value. However, alternatively only the enrichment-determining correction term DPR may be corrected to a decreased value, or both an increase in the DPL value and a decrease in the DPR value may be effected. In short, when the catalyst performance is deteriorated, the DPR value and/or the DPL value is changed so that the ratio DPR/DPL becomes smaller than a value assumed when the catalyst performance is normal.

Figure 9:
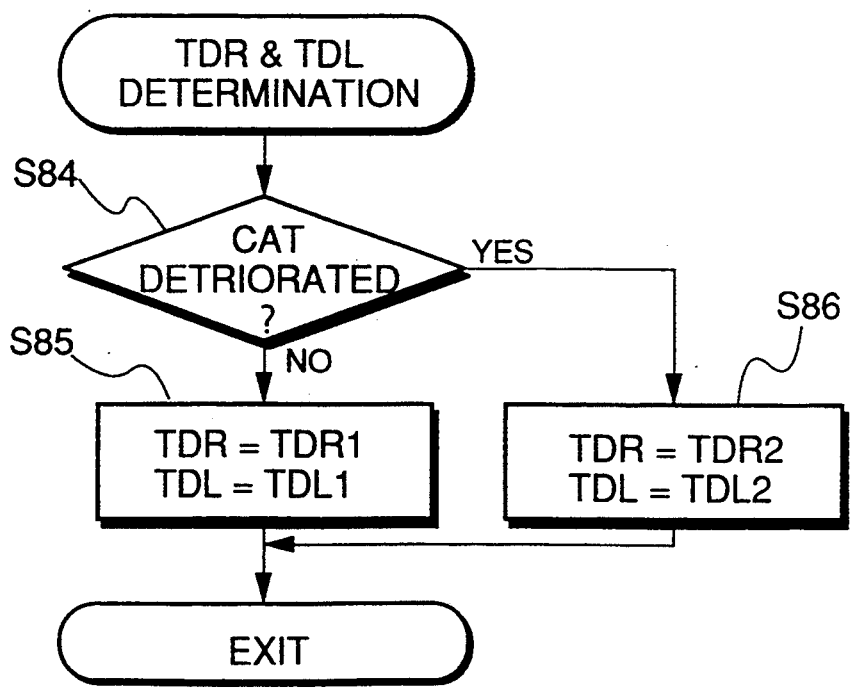
FIG. 9 is a flowchart showing a program for calculating parameter values TDL and TDR used in the program of FIGS. 3A and 3B.

FIG. 9 shows another method for coping with deterioration of the catalyst performance, which, in place of changing the correction terms DPR and DPL, changes first and second predetermined time periods TDR and TDL which determine the delay time from the inversion of the first lean/rich flag FAF1 to the inversion of the second lean/rich flag FAF2.

In the figure, when no deterioration of the catalyst performance is detected at a step S84, the TDR and TDL values are set to respective predetermined values TDR1 and TDL1 for normal catalyst performance (e.g. values corresponding, respectively, to 120 msec and 40 msec) at a step S85. However, when deterioration of the catalyst performance is detected at the step S84, the TDR and TDL values are set to respective predetermined values TDR2 and TDL2 for deteriorated catalyst performance (e.g. values corresponding, respectively, to 60 msec and 10 msec) at a step S86.

By setting the TDR and TDL values as mentioned above, when the catalyst is deteriorated, the ratio of a delay time after inversion of the upstream O2 sensor output R-FVO2 from the lean side to the rich side (T2 and T8 in FIG. 6(b)) to a delay time after inversion of the upstream O2 sensor in the opposite direction (T4 and T10 in FIG. 6(b)) becomes larger than a value of the same ratio obtained when the catalyst has normal performance. For example, when the catalyst normally functions, |TDR1|/TDL1 is 3, whereas when the catalyst is deteriorated, |TDR2|/TDL2 is 6. Therefore, the time period over which the integral control is effected in the direction of addition of the I term (T1+T2 and T5+T6+T7+T8 of FIG. 6(b)) becomes relatively longer, resulting in that the supplied air-fuel ratio is biased in the richer direction. Therefore, according to this method as well, even when the catalyst is deteriorated, the supplied air-fuel ratio can be prevented from deviating in the leaner direction.

In the method of FIG. 9, both of the TDR and TDL values are changed. However, alternatively only the |TDR| value may be increased, or only the TDL value may be decreased. That is, the TDR value and/or the TDL value may be changed so as to make larger the ratio |TDR|/TDL than a value obtained in the case of normal catalyst.

The correction coefficient L-KO2 may also be calculated, similarly to the calculation of the R-KO2 value described hereinabove, i.e. by replacing the R-KO2 with the L-KO2 in the program of FIGS. 3A and 3B.

Next, how deterioration of the performance of the catalysts 14R and 14L is determined will be described with reference to FIGS. 10 to 13. The manners of determination of deterioration of the catalysts 14R and 14L are the same. First, the manner of determination of deterioration of the catalyst 14R will be described hereinbelow. As shown in FIG. 11, during execution of the feedback control in which the correction coefficient R-KO2 is calculated based only on the output RVO2 from the downstream O2 sensor 17, calculations are made of a time period TL from a time point a special P term PLSP for skipping the R-KO2 value in the decreasing direction is generated to a time point the O2 sensor output RVO2 is correspondingly inverted, and a time period TR from a time point a special P term PRSP for skipping the R-KO2 value in the increasing direction is generated to a time point the O2 sensor output RVO2 is correspondingly inverted. The determination of deterioration of the catalyst performance is carried out based on the thus calculated time periods TL and TR.

Figure 10B:
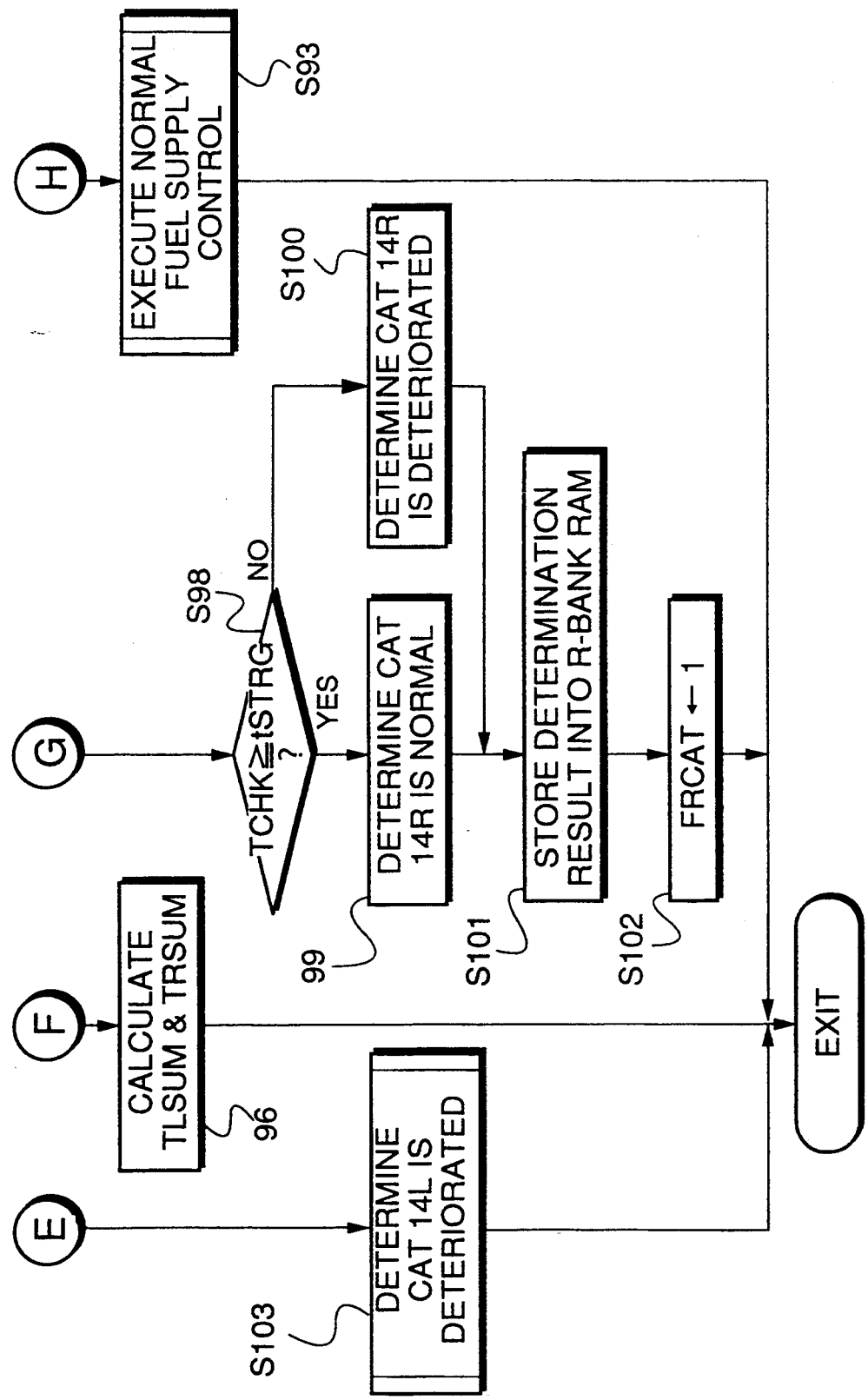
FIG. 10 is a flowchart showing a program for carrying out determination of deterioration of the catalytic converter arranged in the R bank.

FIG. 10 shows a program for executing the above determination of deterioration of the catalyst 14R.

If the aforementioned monitoring condition for catalyst deterioration is satisfied, as determined at the step S8 of FIG. 2, first it is determined at a step S90 whether or not a flag FRCAT, which is set to "1" when determination of deterioration of the catalyst 14R is completed, is set to "1". In the first loop of execution of the program, the flag FRCAT is set to "0", and therefore the program proceeds to a step S91, where it is determined whether or not preconditions for determination of deterioration of the catalyst 14R are satisfied. The preconditions are satisfied, for example, when the engine is operating in a steady condition.

If the preconditions are not satisfied, cumulative values TLSUM and TRSUM of the respective time periods TL and TR and numbers of times of measurement nTL and nTR of the respective time periods TL and TR are all reset to 0 at a step S92, and the normal fuel supply control according to the programs of FIGS. 3A, 3B to 5 is executed at a step S93.

If the preconditions are satisfied, it is determined at a step S94 whether or not the measurements of the TL and TR values have been carried out a predetermined number of times. In the first loop of execution of the program, the answer to the question of the step S94 becomes negative (NO), and then the program proceeds to a step S95, where the PI (proportional integral) control based only on the downstream O2 sensor output RVO2 is executed, the R-KO2 value is set to and held at the learned value L-KREF, and the TL and TR values are measured. Then, the cumulative values TLSUM and TRSUM thereof are calculated at a step S96.

Specifically, as shown in FIG. 11, at a time point t2 a predetermined time period tLD has elapsed after a time point t1 a lean-to-rich inversion of the O2 sensor output RVO2 occurred, the R-KO2 value is skipped in the decreasing direction using the leaning special P term PLSP, and then the I term control is executed by progressively decreasing the R-KO2 value until a time point t4 a predetermined time period tRD has elapsed after a time point t3 a rich-to-lean inversion of the sensor output RVO2 occurred. The time period from the time point t2 to the time point t3 is measured as a TL value ($TL_1$). Next, at the time point t4, the R-KO2 value is skipped in the increasing direction by the use of the enriching special P term PRSP, and then the I term control is executed by progressively increasing the R-KO2 value until a time point t6 a predetermined time period tLD has elapsed after a time point t5 a lean-to-rich inversion of the sensor output RVO2 occurred. The time period from the time point t4 to the time point t5 is measured as a TR value ($TR_1$). Thereafter, $TL_2$, $TR_2$, ... are successively measured in the same manner as above, followed by calculating the cumulative values TLSUM and TRSUM of the measured TL and TR values.

If the answer to the question of the step S94 is affirmative (YES), i.e. if the measurement has been carried out the predetermined number of times, a determination time period TCHK is calculated by the use of the following equation (4) at a step S97:

$$TCHK = (TLSUM/nTL + TRSUM/nTR)/2 \qquad (4)$$

Then, it is determined at a step S98 whether or not the determination time period TCHK exceeds a predetermined value tSTRG. If the TCHK exceeds the predetermined value tSTRG, it is determined at a step S99 that the catalyst 14R is in a normal state, whereas if it is smaller than the predetermined value tSTRG, it is determined at a step S100 that the catalyst 14R is deteriorated.

Figure 12:
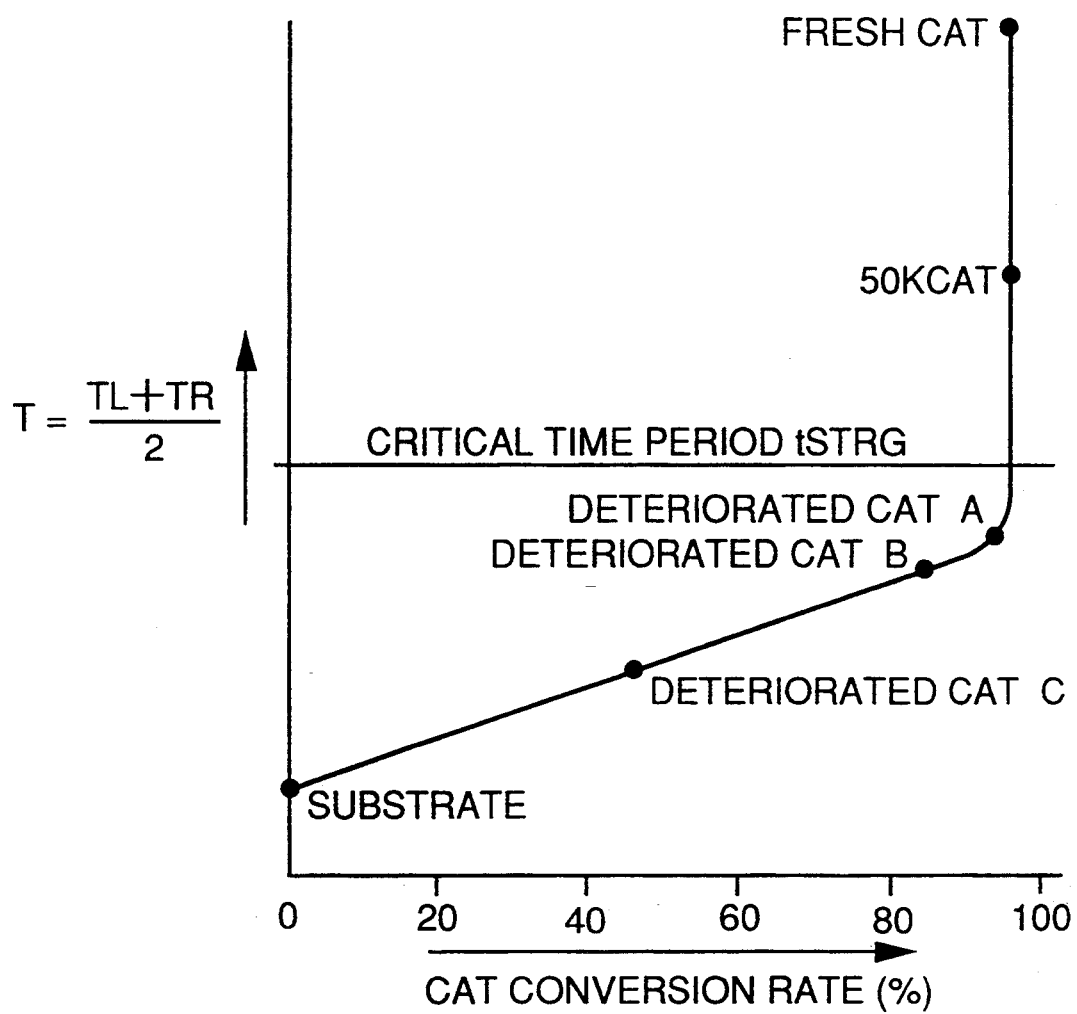
FIG. 12 is a graph which is useful in explaining a manner of determination of deterioration of the catalytic converter.

This determination of deterioration is based on the fact that an average value T of the time periods TL and TR and the purification rate of the catalyst (CAT conversion rate) are in the relationship as shown in FIG. 12. As shown in the figure, the average value T decreases as the performance of the catalyst (O2 storage capacity) becomes degraded. By utilizing the FIG. 12 relationship, the deterioration of the catalyst can be accurately determined.

As is apparent from FIG. 12, the determination time period TCHK indicates the deterioration degree of the catalyst, and therefore the correction terms DPR and DPL or the predetermined values TDR and TDL for determining the delay times may be set so as to progressively change with advancement of the deterioration degree (TCHK) of the catalyst.

At the following step S101, a determination result obtained at the step S99 or S100 is stored into the RAM for the R bank, and then at a step S102, the flag FRCAT is set to "1", followed by terminating the determination of deterioration of the catalyst 14R. When the FIG. 10 program is executed next time with the monitoring conditions for the catalyst deterioration continually satisfied, the answer at the step S90 becomes affirmative (YES), and then determination of deterioration of the catalyst 14L is carried out at a step S103.

Figure 13:
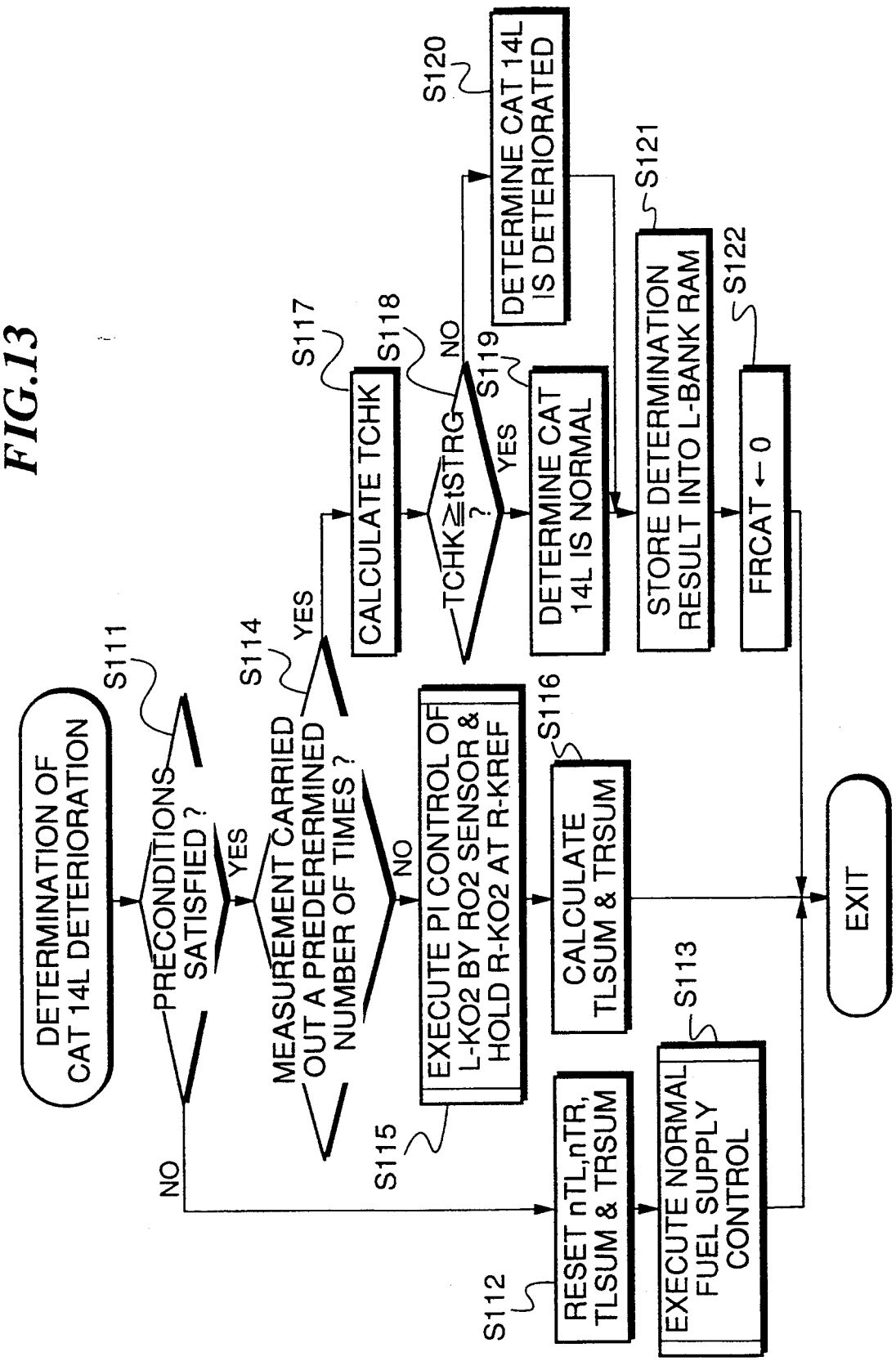
FIG. 13 is a flowchart showing a program for carrying out determination of deterioration of a catalytic converter arranged in an L bank.

FIG. 13 shows a program for executing determination of deterioration of the catalyst 14L. Steps S111 to S120 of FIG. 13 correspond to the steps S91 to S100 of FIG. 10 for determination of deterioration of the catalyst 14R, respectively. Therefore, the steps S111 to S120 are identical in processing with the corresponding steps S91 to S100, except for the step S115, at which the L-KO2 value is PI-controlled by the downstream O2 sensor output RVO2 and the R-KO2 value is set to and held at a learned value L-KREF, the step S119, at which it is determined that the three-way catalyst 14L is normal, and the step S120, at which it is determined that the three-way catalyst 14L is deteriorated.

Then, at a step S121, a determination result obtained at the step S119 or S120 is stored into the RAM for the L bank, followed by setting the flag FRCAT to "0" at a step S122 so that the determination of deterioration of the three-way catalyst 14R is carried out on the next occasion of monitoring for the catalyst deterioration.

In the above described embodiment, the learned values L-KREF and R-KREF are used as stationary values of the correction coefficients L-KO2 and R-KO2, respectively. However, for example, a fixed value of 1.0 may be used in place of the learned values.

What is claimed is:

1. In an air-fuel ratio control system for an internal combustion engine having a plurality of cylinders divided into a first group of cylinders and a second group of cylinders, first and second exhaust systems extending respectively from said first and second groups of cylinders, said first and second exhaust systems having downstream end portions thereof joined together into a confluent portion, and first and second catalytic converters arranged respectively in said first and second exhaust systems, said air-fuel ratio control system including first and second upstream oxygen sensors arranged respectively in said first and second exhaust systems upstream of said first and second catalytic converters, and a single downstream oxygen sensor arranged in said confluent portion of said first and second exhaust systems downstream of said first and second catalytic converters, the improvement comprising:

first air-fuel ratio control means operable when said engine is in a predetermined operating condition, for controlling the air-fuel ratio of an air-fuel mixture supplied into said first group of cylinders by the use of a first air-fuel ratio control amount based on outputs from said first upstream oxygen sensor and said downstream oxygen sensor, and for controlling the air-fuel ratio of an air-fuel mixture supplied into said second group of cylinders by the use of a second air-fuel ratio control amount based on outputs from said second upstream oxygen sensor and said downstream oxygen sensor;

second air-fuel ratio control means operable when said engine is in an operating condition other than said predetermined operating condition, for controlling the air-fuel ratio of an air-fuel mixture supplied into one of said first and second groups of cylinders By the use of a third air-fuel ratio control amount based solely on an output from said downstream oxygen sensor, and for controlling the air-fuel ratio of an air-fuel mixture supplied into the other of said first and second groups of cylinders by the use of a predetermined value; and catalyst deterioration-detecting means for detecting deterioration of said first catalytic converter or said second catalytic converter, based on an output from said second air-fuel ratio control means.

2. An air-fuel ratio control system as claimed in claim 1, wherein said predetermined value is a learned value of one of said first and second air-fuel ratio control amounts.

3. An air-fuel ratio control system as claimed in claim 1, wherein said predetermined value is a fixed value.

4. An air-fuel ratio control system as claimed in claim 1, wherein said second air-fuel ratio control means alternately controls the air-fuel ratios of said first and second groups of cylinders by the use of said third air-fuel ratio control amount and said predetermined value for each group of cylinders, said catalyst deterioration-detecting means alternately detecting deterioration of said first catalytic converter and deterioration of said second catalytic converter, based on said output from said second air-fuel ratio control means.

5. An air-fuel ratio control system as claimed in claim 1, wherein said catalyst deterioration-detecting means detects deterioration of said first and second catalytic converters, based on an inversion time period of said output from said downstream oxygen sensor obtained during operation of said second air-fuel ratio control means.

* * * * *